3,448,136
AMINOXYSILANES
Kailash Chandra Pande, Adrian, Mich., and Richard Eugene Ridenour, Sylvania, Ohio, assignors to Stauffer Chemical Company, New York, N.Y., a corporation of Delaware
No Drawing. Filed Dec. 27, 1965, Ser. No. 516,747
Int. Cl. C07f 7/10
U.S. Cl. 260—448.2      5 Claims

ABSTRACT OF THE DISCLOSURE

Aminoxysilanes of the formula $R_nSi(ON-R'_2)_{4-n}$ are disclosed. In the above formula R and R' may be H, 1 to 4 C aliphatic radicals, monoalicyclic hydrocarbon radicals, monocyclic aromatic hydrocarbon radicals, the foregoing radicals when halo or cyano-substituted, alkoxy and acyloxy groups; one R must always be acyloxy; n is 1 to 3. The novel compounds are useful as endblockers in silicone chemistry.

---

This invention relates to a new class of chemical compounds and methods for the production of such compounds.

These compounds have utility as "endblockers" in silicone chemistry and are also useful in the preparation of resins having potential as components of metal protectants, for example.

The compounds herein conform to the formula:

$$R_nSi(ON-R')_{4-n}$$
$$\phantom{R_nSi(O}|$$
$$\phantom{R_nSi(ON-}R'$$

in which R may be an aliphatic radical of from 1 to 4 carbon atoms, an alicyclic radical, an aromatic radical, such hydrocarbon radicals when halo or cyano-substituted, an alkoxy group or an acyloxy group, R' may be any of the foregoing or hydrogen and n is 0, 1, 2 or 3. The two R's, it is to be understood, may be the same or different.

In accordance with the invention, the compounds are produced by any one of three methods.

Following the preferred method, a compound as defined is prepared by reacting the corresponding hydroxylamine, that is an hydroxylamine containing the two R' groups desired in the product, with a halosilane comprising the R group desired in the product:

I.
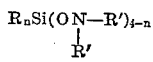

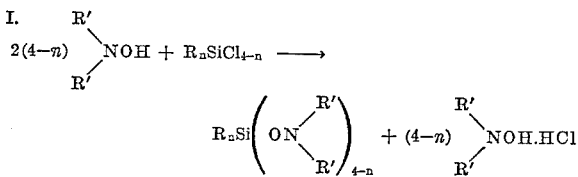

As indicated, half of the hydroxylamine is consumed in the production of the aminoxysilane, while the other half is taken up by the liberated HCl to give an hydroxylammonium chloride, also comprising 2R'.

The above reaction is best carried out in the absence of moisture in any substantial quantity, using an excess, i.e., 2.1 to 2.5 moles, of the hydroxylamine. For best results, employment of a solvent for the reactants, as heptane, cyclohexane, ether, benzene, toluene or the like, is recommended. The solvent reduces the overall viscosity of the mixture and in general facilitates the reaction. Perhaps more importantly, through the use of such a solvent the byproduct hydroxylammonium halide becomes precipitated and is easily removed.

In a second method for preparing the compounds of the invention, an ester interchange technique is applied. Thus, using this method, an acyloxysilane is allowed to reflux in the presence of a stoichiometric amount of an hydroxylamine comprising the R' groups desired in the product aminoxysilane:

II.
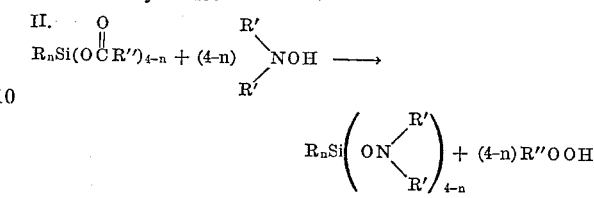

The liberated carboxylic acid may be removed azeotropically by continuous fractionation or may be precipitated out through the use of a reagent nonreactive with respect to the aminoxysilane product.

The invention is further illustrated by the accompanying examples which are not to be taken as in anyway restrictive:

EXAMPLE I 17 grams of silicon tetrachloride (0.1 mole), were dissolved in 200 ml. of anhydrous heptane. This solution was then introduced into a 500 ml. three-neck flask, fitted with a mechanical stirrer, reflux condenser, nitrogen inlet and addition funnel.

To this solution, were added, through the addition funnel with stirring, 73 grams (0.82 moles) of N,N-diethylhydroxylamine dissolved in 50 ml. of heptane. The addition required about 30 minutes.

The reaction mixture became cloudy immediately upon addition of the N,N-diethylhydroxylamine and the ensuing reaction was exothermic. Temperature control was achieved by the relatively slow rate of addition of the hydroxylamine.

Following additional stirring at 50°–60° for 2 hours, the white precipitate of N,N-diethylhydroxylammonium chloride was removed by filtration through a #1 whatman filter paper. Next, the solvent and excess N,N-diethylhydroxylamine were removed by stripping in vacuo.

The resultant product, tetrakis(N,N-diethylaminoxy)silane was distilled at 95° and 0.045 mm. Analysis (I.R., N.M.R.) verified the structure and composition of the product.

EXAMPLE II

Into a three-neck 500 ml. flask, fitted with a mechanical stirrer, reflux condenser, nitrogen inlet and addition funnel was placed a mixture of 22.4 grams (0.15 mole) of methyltrichlorosilane and 250 ml. of anhydrous heptane.

To this mixture was added, with stirring, over a 30 minute period, 84.6 grams (0.95 mole) of N,N-diethylhydroxylamine in 50 ml. of anhydrous heptane.

The reaction mixture again became cloudy immediately upon starting the addition.

After stirring for 1 hour, the precipitate of N,N-diethylhydroxylammonium chloride was removed by filtration through a #1 Whatman filter paper as before, whereafter solvent and excess N,N-diethylhydroxylamine were stripped off in vacuo.

The product distilled at 76° and 25 microns pressure, and analyses (I.R., N.M.R.) verified that the distillate was methyl tris(N,N-diethylaminoxy)silane.

EXAMPLE III

Into a two-liter one-neck flask were placed 22.0 grams (0.1 mole) of methyltriacetoxysilane, 26.7 grams (0.3 mole) of N,N-diethylhydroxylamine and 1000 ml. of anhydrous benzene.

Acetic acid-benzene azeotrope was removed by distillation until 900 ml. had been taken off. Thereafter, the product was stripped in vacuo and distilled.

Two fractions were taken, one at 45° C. and 0.20 mm. and the other at 71° C. and 0.05 mm.

Subsequent analysis (N.M.R.) showed 85% methyl acetoxy bis(N,N-diethylaminoxy)silane and 15% methyl tris(N,N-diethylaminoxy)silane.

EXAMPLE IV

Into a one-liter, one-neck flash were placed 22 grams (0.1 mole) of methyltriacetoxysilane, 8.9 grams (0.1 mole of N,N-diethylhydroxylamine and 750 ml. of anhydrous benzene.

The acetic acid-benzene azeotrope was removed by distillation until 650 ml. had been removed. Subsequently, the product was stripped of solvent in vacuo and distilled at 46° and 0.40 mm. to give methyl diacetoxy(N,N-diethylaminoxy)silane.

EXAMPLE V

Into a 250 ml., 3-neck flask, fitted with mechanical stirrer, reflux condenser, nitrogen inlet and addition funnel, was placed 12.9 grams (0.2 mole) of dimethyldichlorosilane in 150 ml. of dry heptane.

To this was added dropwise, and with stirring, 30.0 grams (0.337 mole) of N,N-diethylhydroxylamine in 25 ml. of heptane. The solution clouded immediately upon starting the addition which was spread out over 30 minutes, the reaction being exothermic. Subsequently, the mixture was stirred for 1 hour, filtered through a #1 whatman filter paper to remove precipitated N,N-diethylhydroxylammonium chloride and vacuum stripped.

The product distilled at 34° and 0.05 mm. Chemical analysis verified that the product was dimethyl bis(N,N-diethylaminoxy)silane.

EXAMPLE VI

Into a three-neck, 1-liter flask, fitted with mechanical stirrer, reflux condenser, nitrogen inlet and addition funnel, were placed 108.6 grams (1.0 mole) of trimethyl chlorosilane dissolved in 400 ml. of anhydrous ether.

To this mixture was added, with stirring, over a 30 minute period, 180 grams (2.02 moles) of N,N-diethylhydroxylamine in 100 ml. of anhydrous ether. The reaction mixture was stirred another 2 hours, then filtered through a #1 whatman filter paper to remove precipitated N,N-diethylhydroxylammonium chloride and stripped in vacuo.

The product distilled at 84° and 760 mm. Analysis verified the product as trimethyl mono(N,N-diethylaminoxy)silane.

EXAMPLE VII

Into a 250 ml., 3-neck flask, fitted with mechanical stirrer, reflux condenser, nitrogen inlet and addition funnel, were placed 11.5 grams (0.1 mole) of methyldichlorosilane

and 150 ml. of anhydrous heptane.

To this mixture was added, dropwise, over a 30 minute period, 38 grams (0.427 mole) of N,N-diethylhydroxylamine in 25 ml. of heptane.

As usual, the reaction clouded immediately upon starting the addition and gave off heat. After the addition was complete, the mixture was stirred for 1 hour, filtered through a #1 whatman filter paper to remove precipitated N,N-diethylhydroxylammonium chloride, stripped in vacuo and distilled at 36° and 0.25 mm. pressure.

Analysis verified that the product was methyl hydrogen bis(N,N-diethylaminoxy)silane.

EXAMPLE VIII

Into a 500 ml., 3-neck flask, fitted with mechanical stirrer, reflux condenser, nitrogen inlet and addition funnel, were placed 21.1 grams (0.15 mole) of methylvinyldichlorosilane and 250 ml. of anhydrous heptane.

To this mixture was added, dropwise, over a 30 minute period, 55 grams (0.618 mole) of N,N-diethylhydroxylamine in 50 ml. of heptane. The reaction was exothermic and clouded immediately upon addition of the first drop of N,N-diethylhydroxylamine.

After the addition was complete, the reaction was stirred for 1 hour, filtered through a #1 whatman filter paper to remove N,N-diethylhydroxylammonium chloride, stripped and distilled at 54° and 0.025 mm.

N.M.R. analysis verified that the product was methylvinyl bis(N,N-diethylaminoxy)silane.

EXAMPLE IX

Into a 3-neck, 250 ml. flask, fitted with mechanical stirrer, reflux condenser, nitrogen inlet and addition funnel, were placed 16.5 grams (0.1 mole) of methoxytrichlorosilane and 125 ml. of anhydrous heptane.

To this mixture was added, dropwise, over a 30 minute period, 62.3 grams (0.7 mole) of N,N-diethylhydroxylamine in 25 ml. of heptane. The reaction was exothermic and clouded immediatly upon addition of the N,N-diethylhydroxylamine.

After the addition was complete, the reaction mixture was stirred for 1 hour, filtered through a #1 whatman filter paper to remove precipitated N,N-diethylhydroxylammonium chloride, stripped and distilled at 65° and 50 microns' pressure.

Chemical analysis verified that the compound was methoxy tris(N,N-diethylaminoxy)silane.

What is claimed is:

1. A compound conforming to the formula:

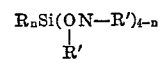

in which R is selected from the class consisting of hydrogen, aliphatic radicals of from 1 to 4 carbon atoms, monoalicyclic hydrocarbon radicals, monocyclic aromatic hydrocarbon radicals, such hydrocarbon radicals when halo or cyano-substituted, alkoxy groups and acyloxy groups, provided, however, that at least one acyloxy group is always present, R' may be any of the foregoing and $n$ is 1, 2, or 3.

2. A compound conforming to claim 1 containing at least one acetoxy group in the R position.

3. A compound in accordance with claim 1 where $n$ is 2 and the two groups in the R position are, respectively, alkoxy and acyloxy.

4. A compound in accordance with claim 1 where $n$ is 2, where the two R groups are methyl and acetoxy and where both R' groups are ethyl.

5. A compound in accordance with claim 1 where $n$ is 3, where the three R groups are methyl, acetoxy and acetoxy and where both R' groups are ethyl.

References Cited

UNITED STATES PATENTS

| | | |
|---|---|---|
| 2,955,127 | 10/1960 | Pike. |
| 3,162,663 | 12/1964 | Beck. |
| 3,184,427 | 5/1965 | Russell et al. __ 260—448.2 XR |
| 3,189,576 | 6/1965 | Sweet _____ 260—448.2 XR |
| 3,296,199 | 1/1967 | Murphy _____ 260—448.2 XR |
| 3,318,898 | 5/1967 | Boissieras ____ 260—448.2 XR |

TOBIAS E. LEVOW, *Primary Examiner.*

P. F. SHAVER, *Assistant Examiner.*

U.S. Cl. X.R.

260—46.5, 448.8

UNITED STATES PATENT OFFICE
CERTIFICATE OF CORRECTION

Patent No. 3,448,136                                  June 3, 1969

Kailash Chandra Pande et al.

It is certified that error appears in the above identified patent and that said Letters Patent are hereby corrected as shown below:

Column 2, lines 7 to 14, that portion of the formula readin "+(4-n)R″OOH" should read -- +(4-n)R″COOH --. Column 4, lines 36 to 38, the formula should appear as shown below:

$$R_nSi(ON-R')_{4-n}$$
$$|$$
$$R'$$

Signed and sealed this 5th day of May 1970.

(SEAL)

Attest:

Edward M. Fletcher, Jr.                          WILLIAM E. SCHUYLER, JR.

Attesting Officer                                         Commissioner of Patents